UNITED STATES PATENT OFFICE.

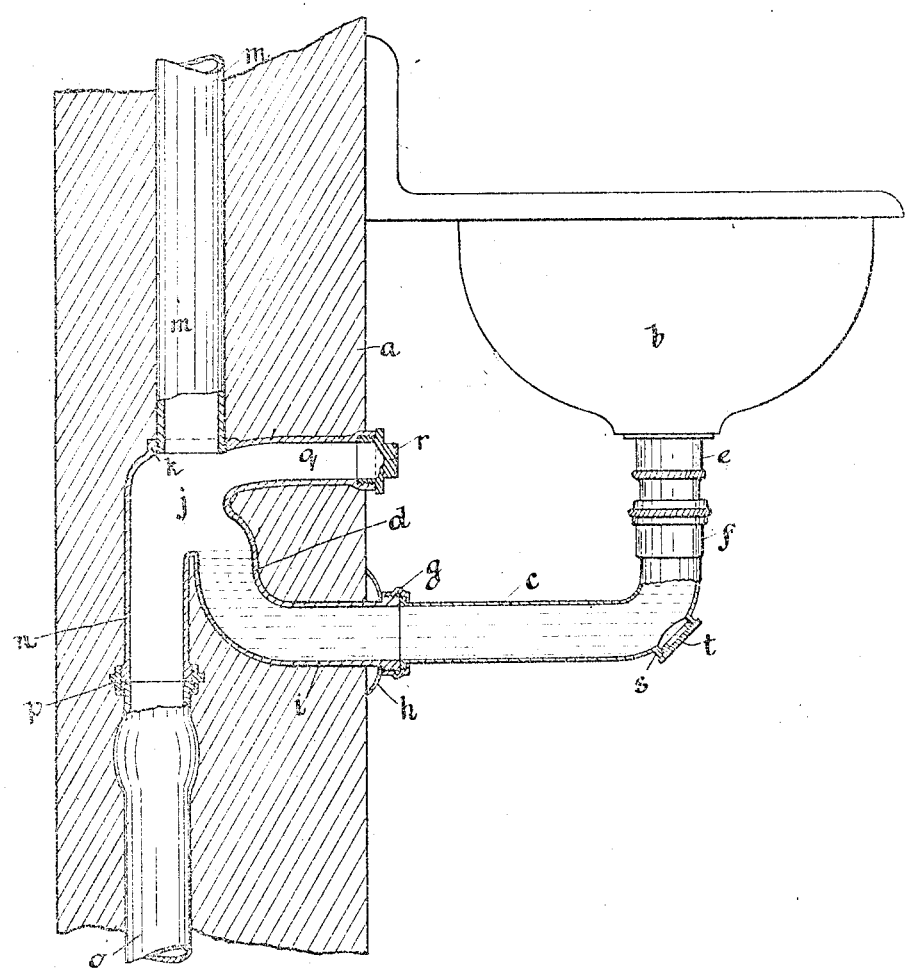

THOMAS E. DOYLE, OF MILWAUKEE, WISCONSIN.

SINK-TRAP.

No. 926,552.  Specification of Letters Patent.  Patented June 29, 1909.

Application filed April 16, 1908. Serial No. 427,454.

*To all whom it may concern:*

Be it known that I, THOMAS E. DOYLE, of Milwaukee, Wisconsin, have invented a Sink-Trap, of which the following is a specification.

This invention relates to water-traps adapted for sinks, basins, and all purposes to which a sink is adaptable; and the object of my invention is to provide a trap which is to all appearances completely hidden within the wall and yet can be easily and readily cleaned out without disturbing the wall.

My invention comprises in its chief features a trap of the S-type having a long horizontal limb at its first lower bend, which separates the basin-drain from the rest of the trap and enables all that part of the trap except the horizontal limb to be set in the wall; a readily disconnectible joint in said limb; and a second outlet extending from the upper bend of the trap within the wall to a point outside the wall.

My invention can best be understood from a consideration of the accompanying drawing showing the most approved form thereof, taken in connection with the following description thereof. In this drawing, the trap is shown in longitudinal section in position in the wall, having a sink or basin $b$ connected thereto.

The trap is made in two parts, designated $c$ and $d$ respectively, the first being connected to the drain-outlet $e$ of the basin $b$ by a union $f$ or in any other approved manner, and being connected to the second section by a union $g$, which lies as close as possible to the face of the wall $a$, the hole in the latter being, if desired, covered by a canopy $h$. The section $c$ corresponds to a part of the first bend of the trap, the remainder of said bend being completed by the limb $i$ of the section $d$, which as shown is upwardly bent, forming the usual U-shaped water-seal. At the upper end of the limb $i$ is an air-chamber $j$, which has an outlet $k$ communicating with the outer air through a vent-pipe $m$; and a downwardly extending limb $n$ communicates with the house-drain $o$, to which it is secured by a union or other form of joint $p$.

The important element of this invention which I claim as new consists of the side-outlet $q$ at the top of the air-chamber $j$, which extends to a point on the face of the wall and is covered by a screw-plug $r$. Through this outlet the trap may be cleaned, especially the limb $n$ and air-chamber $j$ thereof, of any obstructing matters, as by removing the plug $r$ a wire or other cleaning device can readily be inserted into the trap and the obstruction removed without in any way disturbing the settings of the trap or the wall. Ordinarily there will also be another cleaning outlet $s$ at the bend of the horizontal limb $c$, which is closed by a screw-plug $t$.

Having thus described my invention, what I claim as new and desire to secure by Letters Patent is:

1. A sink or trap of the S-pattern having a main body adapted to lie within a wall, the lower bend thereof being prolonged into a horizontal limb extending outside the wall to a point beneath the drain-outlet of a sink or basin and adapted to be connected thereto, said part within the wall comprising an upward bend, an air-chamber at the top of said bend and a downward bend adapted to be connected with a drain-pipe, a tubular cleaning-outlet extending from said air-chamber, to the face of the wall, and a covering for the end of said cleaning-outlet.

2. The combination of a wall, a trap having a main body including an air-chamber therein lying within said wall and having a long horizontal limb constituting a water-seal and extending to a point outside the wall and from there extending upwardly, a sink or basin having a drain-outlet directly connected with said horizontal limb, a tubular cleaning outlet extending from the air-chamber of said trap to the face of said wall, and a plug closing said outlet.

3. In combination with a wall and a basin, a trap of the S-type having the main body thereof lying within said wall and having the lower bend thereof prolonged to form a horizontal limb which extends outside said wall, is turned upwardly at the end and connected with the drain-outlet of said basin, said trap having further an air-chamber at the top of its upper bend and a downwardly extending limb from said air-chamber connected with a house-drain, a tubular outlet extending from said air-chamber, to the face of said wall, and a screw-plug closing said outlet on the face of said wall.

In witness whereof I have hereunto set my hand this eleventh day of April, 1908.

THOS. E. DOYLE.

Witnesses:
  GEO. KAAD,
  LYDIA FICK.